United States Patent [19]

Ueda et al.

[11] Patent Number: 5,198,508

[45] Date of Patent: Mar. 30, 1993

[54] RESIN COMPOSITIONS AND MOLDED ARTICLES

[75] Inventors: Hiroshi Ueda, Yokohama; Yoshio Yoshida, Machida; Hiroshi Inoue; Toshikazu Kaneda, both of Yokohama; Toshiaki Moriya, Sagamihara; Tsutomu Kumazawa, Hiratsuka, all of Japan

[73] Assignee: Mitsui Toatsu Chemicals, Inc., Tokyo, Japan

[21] Appl. No.: 760,923

[22] Filed: Sep. 17, 1991

[30] Foreign Application Priority Data

Sep. 18, 1990 [JP] Japan .................. 2-246282

[51] Int. Cl.$^5$ .............................................. C08L 75/00
[52] U.S. Cl. ...................... 525/454; 525/455; 525/457; 528/49; 528/60; 528/61; 528/64; 528/74.5; 528/75; 528/76; 264/328.1; 264/328.6; 264/328.8
[58] Field of Search ............... 525/454, 455, 457; 528/49, 60, 61, 64, 74.5, 75, 76; 264/328.1, 328.6, 328.8

[56] References Cited

U.S. PATENT DOCUMENTS

| | | | |
|---|---|---|---|
| 4,058,492 | 11/1977 | von Bonin et al. | 264/300 |
| 4,130,698 | 12/1978 | Sparrow et al. | 521/130 |
| 4,201,847 | 5/1980 | Kleimann et al. | 521/17.2 |
| 4,218,543 | 8/1980 | Weber et al. | 521/51 |
| 4,254,228 | 3/1981 | Kleimann et al. | 521/162 |
| 4,609,682 | 9/1986 | Weber et al. | 521/117 |
| 4,774,284 | 9/1988 | Iwasa | 525/54 |
| 4,794,129 | 12/1988 | Gillis, Jr. et al. | 521/121 |
| 4,848,224 | 9/1989 | Harasin et al. | 521/124 |
| 4,954,537 | 9/1990 | Sanns, Jr. | 521/157 |

FOREIGN PATENT DOCUMENTS

180749 5/1986 European Pat. Off. .

OTHER PUBLICATIONS

European Polymer Journal, vol. 22, No. 8, 1986, pp. 633–635.

*Primary Examiner*—Maurice J. Welsh
*Attorney, Agent, or Firm*—Burns, Doane, Swecker & Mathis

[57] ABSTRACT

There is disclosed a resin composition comprising a product produced by the reaction of (a) a prepolymer prepared by reacting a diisocyanate with a hydroxy fatty acid ester or a mixture of a hydroxy fatty acid ester and a polyether polyol, with (b) at least one member selected from the group consisting of aromatic polyamines, polyether polyamines and polyether polyimines or a mixture of such a member as above and a polyether polyol. The resin composition is useful as an internal release agent for resins for reaction injection molding.

20 Claims, No Drawings

RESIN COMPOSITIONS AND MOLDED ARTICLES

BACKGROUND OF THE INVENTION

1. Field of the Invention

The present invention relates to a resin composition, and more particluarly, to a resin composition containing an internal release agent that facilitates releasing of molded resin products from molds.

2. Description of the Related Art

In general, when polyurethane resins are molded in a mold, external release agents such as waxes, metal soaps and the like are applied to the mold each time.

However, such a method is disadvantageous from the standpoint of productivity as compared with molding of thermoplastic resins where an external release agent is dispensable in the case of mass production of automotive parts such as bumpers, fenders and the like.

In order to solve the problems, the demand has been to develop internal release agents and resin compositions having a self-releasing property.

As resin compositions with self-releasability, Japanese Patent Application Laid-open No. 17359/1979 discloses a RIM (reaction injection molding) process in which aromatic diamine crosslinking agents more reactive with isocyanates are used in place of low molecular weight glycols which have been heretofore used as crosslinking agents.

Further, Japanese Patent Publication No. 56887/1988 discloses a RIM process where polyether polyamines containing terminal primary amino groups and aromatic amino groups more reactive with isocyanates are used in place of conventional high molecular weight polyether polyols.

U.S. Pat. No. 4,794,129 discloses a RIM process using a polyether polyimine containing terminal imino groups.

By employing the above-mentioned techniques, the releasing property has been improved, but such improvement is not sufficient for facilitating industrial production of large and complicated bumpers. Japanese PCT Publication No. 500418/1985 discloses a technique actually used in industrial production in which fatty acid metal salts dissolved in amines are used as internal release agents.

When fatty acid metal salts are used as internal release agents, the releasing property is good, but washing before coating is problematic. That is, if the fatty acid metal salt bleeding from the molded product is not sufficiently washed from the product, the fatty acid metal salt causes fish eyes and poor adhesiveness upon coating.

When washed with water, the fatty acid metal salt bleeding to the surface can not be washed sufficiently, and therefore, an acid washing method which needs many steps has been employed.

In view of the foregoing, development of a resin composition having both good releasing property and coating property has been demanded.

With respect to techniques of internal release agents other than fatty acid metal salts, Japanese Patent Publication Nos. 24997/1974 and 42092/1980 disclose that fatty acid ester compounds are used for producing urethane foam resin.

Japanese Patent Publication No. 18368/1983 discloses a process for producing foam resin in which there is used a prepolymer produced by reacting a fatty acid ester compound containing hydroxyl groups and/or carboxyl groups with an isocyanate compound.

In addition, Japanese Patent Publication No. 29453/1989 discloses a process for producing urethane or urethane/urea elastomers by RIM where a particular ester compound of ricinolic acid is used as an internal release agent.

Further, U.S. Pat. No. 4,868,224 discloses a process for producing urethane and/or urea elastomers by RIM where a particular fatty acid ester compound containing OH groups is reacted with an isocyanate and the product is used as a prepolymer containing 5-45% NCO.

U.S. Pat. No. 4,868,224 also describes that as another internal release agent, a known zinc salt of fatty acid may be used in combination with the internal release agent. By using these internal release agents or isocyanate compounds containing an internal release agent, an external release agent which is one drawback of thermosetting resins is avoided or the frequent use of an external release agent can be decreased and releasing from mold is good and moreover, the rejection rate caused by urethane residue and built-up of the releasing agent in the mold cavity and breaking upon releasing can be decreased.

Fatty acid ester compounds disclosed in Japanese Patent Publication Nos. 24997/1974, 42092/1980 and 18368/1988 exhibit somewhat of a releasing property when used for low density foam resins, but hardly exhibit any releasing property when used for producing high density RIM elastomers having densities of 0.8-1.2.

According to reaction injection molding (RIM), two types of highly reactive liquid streams are impinged and mixed, and injected into a mold cavity at a high speed. One type of the stream is a stream of a polyisocyanate or a derivative thereof usually called "A" component and the other type of the stream is an isocyanate-reactive stream usually composed of a polyol and/or polyamine reactant called "B" component.

When a known particular ester compound of ricinoleic acid (Japanese Patent Publication No. 29453/1989) is used in the polyol side, "B", according to the example as an internal release agent, there is a releasing effect, but since the molecular ends have secondary hydroxyl groups, the reaction velocity with isocyanates is slow, and strength upon releasing (hereinafter referred to as "green strength") and stiffness upon releasing (shape keeping property) are insufficient. Therefore, it is necessary to lengthen the curing time in the mold.

In the above-mentioned Japanese Patent Publication No. 29453/1989, it is described that even when the fatty acid ester compound is partly reacted with the isocyanate and used as "A", the same releasing property can be exhibited, but the storage stability of the prepolymer is not sufficient. Though there is a releasing effect, it is not better than that when the ester compound of ricinoleic acid is incorporated in the polyol side, "B". The green strength and stiffness upon releasing are not sufficient, and the internal release agent is not sufficiently effective for industrial production of bumpers having a large and complicated shape and the like.

SUMMARY OF THE INVENTION

An object of the present invention is to provide an internal release agent capable of facilitating releasing of molded resin products from molds.

Another object of the present invention is to provide an internal release agent imparting excellent green strength.

A further object of the present invention is to provide an internal release agent imparting an improved stiffness (shape keeping property) to a molded article.

Still another object of the present invention is to provide an internal release agent capable of producing molded products having good coating property.

According to one aspect of the present invention, there is provided a resin composition which comprises a product prepared by the reaction of (a) a prepolymer prepared by reacting at least one member selected from the group consisting of a hydroxy fatty acid ester and a mixture of a hydroxy fatty acid ester and a polyether polyol with a diisocyanate, with (b) a member selected from the group consisting of a polyamine-polyimine component selected from the group consisting of aromatic polyamines, polyether polyamines and polyether polyimines and a mixture of the polyamine-polyimine component and a polyether polyol, at least two equivalents of component (b) being reacted with one equivalent of component (a).

According to another aspect of the present invention, there is provided an internal release agent comprising the above-mentioned resin composition.

DESCRIPTION OF THE PREFERRED EMBODIMENTS

The internal release agent composition of the present invention may facilitate releasing of molded products of polyurethane resins, polyurea resins and the like by reaction injection molding (hereinafter referred to as "RIM") from molds and releasing of molded products of thermosetting resins such as epoxy resins from molds.

As a hydroxy fatty acid ester used as a component of the prepolymer of component (a), there may be mentioned self-condensation products of ricinoleic acid, self-condensation products of 12-hydroxystearic acid, and condensation products of ricinoleic acid and 12-hydroxystearic acid.

The hydroxyl number of the condensation product is in the range of 12-125 and the acid value may be not higher than 10.

Other examples of the hydroxy fatty acid ester are ester group containing compounds produced by the condensation reaction of dihydric alcohol and ricinoleic acid and/or 12-hydroxystearic acid, preferably ester group containing compounds having average molecular weights of 900-4500, hydroxyl numbers of 12-125 and acid values not higher than 10 which may be produced by the condensation reactions of a total amount of 3-15 moles of ricinoleic acid and/or 12-hydroxystearic acid and a total amount of 1 mole of at least one dihydric alcohol having molecular weights ranging from 62 to 400.

Further examples are mixtures of the above-mentioned condensation products and the ester group containing products.

The above-mentioned self-condensation product of ricinoleic acid or 12-hydroxystearic acid, or condensation product of ricinoleic acid and 12-hydroxystearic acid (e.g. having a hydroxyl number of 12-125 and an acid value not higher than 10) may be produced by the heat-dehydration reaction of ricinoleic acid and/or 12-hydroxystearic acid, for example, in the presence of a titanium catalyst.

In addition, hydroxy fatty acid esters may be produced by reacting 3-15 moles of ricinoleic acid and/or 12-hydroxystearic acid with one mole of dihydric alcohol having molecular weight of 62-400, for example, ethylene glycol, 1,2- or 1,3-dihydroxypropane, 1,2- or 1,3- or 2,3-dihydroxybutane, neopentyl glycol, 1,4-bis-hydroxymethyl-cyclohexane, 1,8-dihydroxyoctane, 1,6-hexanediol and mixtures thereof.

Further, there may be used polyether diols, polyester diols, polybutadiene diols, polycarbonate diols, polycaprolactam diols and the like having molecular weights of 62-400, and more preferably, when 1,6-hexanediol is used, the releasing property is particularly good.

Hydroxyl numbers of hydroxy fatty acid esters are preferably 12-125. The acid value thereof is preferably 10 or less. For example, a self-condensation product of ricinoleic acid or 12-hydroxystearic acid, or a condensation product of ricinoleic acid and 12-hydroxystearic acid is of low viscosity and has good compatibility with resins at a hydroxyl number of 12 or higher while it exhibits good releasing property at a hydroxyl number of 125 or less. When the acid value is 10 or less, the level of free acid is so low that a metal catalyst is not adversely affected upon reaction.

The above matters are also the case when the hydroxy fatty acid ester is produced from dihydric alcohols and ricinoleic acid and/or 12-hydroxystearic acid.

Exemplary suitable diisocyanates as starting materials for component (a) are:
aliphatic diisocyanates such as
ethylene diisocyanate,
tetramethylene-1,4-diisocyanate,
hexamethylene-1,6-diisocyanate,
dodecane-1, 12-diisocyanate,
and the like;
alicyclic diisocyanates such as
cyclobutane-1,3-diisocyanate,
cyclobutane-1,4-diisocyanate,
1-isocyanato-3,3,5-trimethyl-5-isocyanatomethyl-cyclohexane,
hexahydrotolylene-2,4-diisocyanate,
hexahydrotolylene-3,6-diisocyanate,
hexahydrophenylene-1,3-diisocyanate,
hexahydrophenylene-1,4-diisocyanate,
perhydrodiphenylmethane-2,4-diisocyanate,
perhydrodiphenylmethane-4,4'-diisocyanate,
and the like;
aralkyl diisocyanate such as
$\alpha,\alpha,\alpha',\alpha'$-tetramethyl-xylylene diisocyanate (TMXDI)
and the like; and
aromatic diisocyanates such as
phenylene-1,3-diisocyanate,
phenylene-1,4-diisocyanate,
tolylene-2,4-diisocyanate,
tolylene-2,6-diisocyanate,
diphenylmethane-2,4'-diisocyanate,
diphenylmethane-4,4'-diisocyanate,
naphthylene-1,5-diisocyanate,
and the like.

Diisocyanates which are liquid at room temperature are preferable. In particular, tolylene-2,4-diisocyanate, tolylene-2,6-diisocyanate or mixtures of isomers thereof, $\alpha,\alpha,\alpha',\alpha'$-tetramethyl-xylylene diisocyanate, and 1-isocyanato-3,3,5-trimethyl-5-isocyanatomethyl-cyclohexane, are preferable.

The prepolymer of component (a) of the present invention may be prepared by mixing the above-mentioned fatty acid ester, or fatty acid ester and polyether polyol with the above-mentioned diisocyanate and reacting them.

The NCO content in the prepolymer of component (a) is preferably 0.5-5%, more preferably 0.5-2%. A NCO content of 5% or less is preferable since gelation of the reaction product in the reaction with component (b) can be prevented while a NCO content of 0.5% or more is preferable since the viscosity of the product of the reaction of component (a) with component (b) does not become high.

The prepolymer may be preferably prepared by reacting one equivalent of a hydroxy fatty acid ester or a mixture of a hydroxy fatty acid ester and a polyether polyol with 1-2 equivalents of a diisocyanate, more preferably 1.3-1.8 equivalents of a diisocyanate.

When the amount of the diisocyanate exceeds 2 equivalents, free isocyanate is present in the resulting prepolymer and thereby gelation of the product of the reaction with component (b) is liable to occur.

The "polyamine-polyimine component" used in component (b) is a member selected from the group consisting of aromatic polyamines, polyether polyamines and polyether polyimines. These members may be used alone or in combination.

Exemplary suitable aromatic polyamines include:
2,4- or 2,6-diaminotoluene,
2,4'- or 4,4'-diamino-diphenylmethane,
1,3- or 1,4-phenylenediamine,
polyphenyl-polymethylene-polyamines prepared by condensation of aniline and formaldehyde,
and liquid or soluble aromatic diamines described in Japanese Patent Publication No. 17359/1979, the disclosure of which is herein incorporated by reference, such as
1,3-diethyl-2,4-diaminobenzene,
2,4-diaminomesitylene,
1-methyl-3,5-diethyl-2,4-diaminobenzene,
1-methyl-3,5-diethyl-2,6-diaminobenzene,
1,3,5-triethyl-2,6-diaminobenzene,
3,5,3',5'-tetramethyl-4,4'-diaminodiphenyl-methane,
1,1-dimethyl-4,6-dimethyl-5,7-diaminoindane,
and the like.

A particularly suitable aromatic polyamine is a mixture of 1-methyl-3,5-diethyl-2,4-diaminobenzene and 1-methyl-3,5-diethyl-2,6-diaminobenzene (hereinafter referred to as "DETDA").

Further, the aromatic polyamines represented by the following formulas may be used:

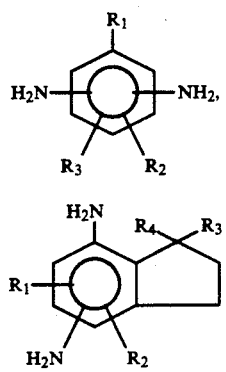

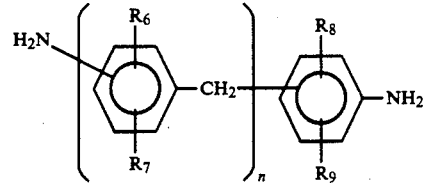

where $R_1$, $R_2$, $R_3$, $R_4$ and $R_5$ are independently selected from the group consisting of hydrogen and alkyl having 1-10 carbon atoms; when at least one of $R_1$, $R_2$ and $R_3$ is alkyl in formula (I), the alkyl is at the ortho position with respect to at least one amino group; when at least one of $R_1$ and $R_2$ is alkyl in formula (II), the alkyl is the ortho position with respect to at least one amino group; and $R_6$, $R_7$, $R_8$ and $R_9$ are independently selected from the group consisting of hydrogen and alkyl having 1-10 carbon atoms and n is an integer of 1-10.

The polyether polamines may be prepared by substituting the molecular ends of a polyether polyol with a primary amino or secondary amino group.

Further, the polyether polyamines may be polyether polyamines described in Japanese Patent Publication No. 56887/1988, the disclosure of which is herein incorporated by reference. For example, aromatic polyether polyamines having terminal amino groups can be prepared by reacting polyether polyol with tolylene diisocyanate and hydrolyzing the resulting product with a large excess of water, or aliphatic polyether polyamines having terminal primary amino groups can be prepared by reacting polypropylene glycol with ammonia.

The polyether polyimines may be prepared by substituting the molecular ends of polyether polyols with imino groups. Further, the polyether polyamine used in the present invention is preferably a polyether polyimine prepared by dehydrating an aliphatic polyether polyamine having terminal primary amino groups together with cyclohexanone, as described in Japanese Patent Application Laid-open No. 273623/1988 , the disclosure of which is herein incorporated by reference.

More preferable aliphatic polyether polyamines having terminal primary amine groups are Jeffamine D-230, D-400, and D-2000 manufactured by Texaco Co. and the like.

The amount of polyamine-polyimine component, or a mixture of polyamine-polyimine component and polyether polyol in component (b) used in the present invention is preferably 2 equivalents or more, more preferably 5 equivalents or more, particularly preferably 10 equivalents or more per one equivalent of the prepolymer of component (a).

When component (b) is used in an amount of 2 equivalents or more per one equivalent of the prepolymer of component (a), it is possible to avoid residual isocyanates in the resin composition, and therefore, the activity of the resin can be retained and a better releasing property is exhibited.

Aromatic polyamines, polyether polyamines or polyether polyimines of component (b) are preferably liquid at room temperature. However, even if a component (b) is not liquid, the component (b) can be used by heating and dissolving the component (b) in polyether polyol in advance.

The polyether polyol used for component (a) or (b) is preferably a polyether polyol having two hydroxyl groups or more at the ends of the molecule.

For example, the polyether polyols may be prepared by chemically adding an epoxide such as ethylene oxide, propylene oxide, butylene oxide, tetrahydrofuran, styrene oxide, epichlorohydrin and the like to an initiator having a reactive hydrogen atom such as water, alcohols, ethylene glycol, propylene glycol, trimethylol propane, 4,4-dihydroxy-diphenylpropane, aniline, ethanolamine, ethylenediamine diamine in the presence of $BF_3$. In addition, there may be used a product prepared by transesterification of terminal hydroxyl groups of polyether polyol with castor oil. The molecular weight of the polyether polyol is preferably 800–12000. If necessary, a polyether polyol having a molecular weight of 800–12000 may be used as a solvent for the reaction of component (a) with component (b) or as a viscosity decreasing agent.

The prepolymer of component (a) may be prepared by the reaction of a hydroxy fatty acid ester with a diisocyanate, but it is preferable to use additionally a polyether polyol since the solubility in resins increases and the continuous releasing characteristic is further improved.

As the polyether polyol used for the prepolymer of component (a), all of the above-mentioned polyether polyols may be used, and polypropylene diols of a molecular weight of 2000–4000 are particularly preferable.

The resin composition of the present invention may be produced by a two-step reaction.

In the first step, a diisocyanate is reacted with a hydroxy fatty acid ester (or a mixture of a hydroxy fatty acid ester and a polyether polyol) to obtain a prepolymer, component (a).

In the second step, the resulting prepolymer, component (a), is reacted with a polyamine-polyimine component or a mixture of a polyamine-polyimine component and a polyether polyol, component (b), the amount of component (a) being one equivalent and that of component (b) being two equivalents or more, and the resin composition of the present invention is obtained.

As an example, a preparation procedure for the resin composition using a hydroxy fatty acid ester produced from ricinoleic acid or 12-hydroxystearic acid is shown below.

The isocyanate reactive resin composition of the present invention may be produced by a two-step reaction. In the first step, a diisocyanate is reacted with at least one of a self-condensation product having a hydroxyl value of 12–125 and an acid value not higher than 10 of ricinoleic acid or 12-hydroxystearic acid, an ester compound prepared from an alkane diol and ricinoleic acid and/or 12-hydroxystearic acid, and a mixture of the above-mentioned self-condensation product and/or ester compound and a polyether polyol to produce a prepolymer (a) containing 0.5–5% NCO.

In the second step, one equivalent of a prepolymer of component (a) is reacted with 2 equivalents or more (as total equivalent) of component (b) such as aromatic polyamines, polyether polyamines and polyether polyimines to prepare an isocyanate reactive resin composition which is liquid at room temperature and comprises a compound having a structure where at least one amino or imino group is attached to the ends of the prepolymer molecule.

The present invention provides further a molded product produced by reaction injection molding of a resin composition, such as polyurethane resin, polyurea resin and the like, containing the above-mentioned internal release agent. The polyurethane resin, polyurea resin and the like may have an isocyanate index of 70–130 and contain 4,4'-diisocyanato-diphenylmethane or 2,4'-diisocyanato-diphenylmethane. The molded product may additionally contain at least one member selected from the group consisting of polymers having a molecular weight of 800–12000 and reactive with isocyanato group (for example, polyether polyol, polyether polyamine and polyether polyimine), aromatic polyamines of the formula (I), aromatic polyamines of the formula (II) and aromatic polyamines of the formula (III).

The resin composition of the present invention has several features and effects different from the composition of Japanese Patent Publication No. 29453/1989 since the resin composition of the present invention has such a structure that the hydroxyl groups of an internal release agent of said Japanese Patent Publication No. 29453/1989 (esters of ricinoleic acid and alkanediol) are stoichiometrically reacted with a compound having terminal amino or imino group.

One feature of the present invention is that the polymer has at least one terminal amino group or imino group and thereby, upon RIM the reactivity with isocyanates is larger than that of a secondary hydroxyl group and therefore, green strength and stiffness upon releasing (shape keeping property) can be improved.

Another feature is that the reactivity with isocyanates is so large that the releasing property is improved.

When a prepolymer partly reacted with an isocyanate is used with the internal release agent shown in Japanese Patent Publication No. 29453/1989 and U.S. Pat. No. 4,868,224, the above-mentioned feature is not exhibited. In addition, the storage stability of the prepolymer is problematic.

A further feature of the resin composition of the present invention is that it can be commercially produced at low cost.

Still another feature of the present invention is that the coating property is improved as compared with conventional fatty acid metal salt internal release agents. Such feature enables manufacturers of bumpers to rationalize or simplify the washing and drying steps.

According to the present invention, there can be produced molded products of good releasing property, moldability and coating property.

The present invention will be further described referring to the following examples and comparison examples.

PREPARATION EXAMPLE 1

[Preparation of Releasing Agent]

(The product here is hereinafter referred to as "IMR-A")

The preparation was carried out following the procedure of Example 2 of Japanese Patent Publication No. 29453/1989. That is, ricinoleic acid 7 moles, 1,6-hexanediol 1 mole and titanium tetrabutyrate 50 ppm were placed in a 3 l. flask and heated to 190° C. The water formed by the reaction was distilled away for 4 hours at atmospheric presure and further at a pressure of 15 mm Hg. All water containing a small amount of organic components was distilled away for further 8 hours. The resulting mixture was kept at 15 mm Hg for a further one hour and then cooled. The resulting release agent had the following characteristics.

Acid value: 1.5

Hydroxyl number: 35

Average molecular weight: 3000
Viscosity: 1300 cps/25° C.

PREPARATION EXAMPLE 2

(The product here is hereafter referred to as "IMR-B")

12-Hydroxystearic acid 7 moles, 1,6-hexanediol 1 mole and titanium tetrabutyrate 50 ppm were placed in a 3 l. flask and the reaction was effected following the procedure of Preparation Example 1.

The resulting releasing agent had the following characteristics.
Acid value: 8.0
Hydroxyl number: 40
Average molecular weight: 2800
Viscosity: 3300 cps/25° C.

PREPARATION EXAMPLE 3

(The product here is hereinafter referred to as "IMR-C")

Ricinoleic acid 7 moles and 1,6-hexanediol 1 mole were placed in a 3 l. flask and the reaction was carried out in the absence of a catalyst following the procedure of Preparation Example 1.

The resulting release agent had the following characteristics.
Acid value: 6.7
Hydroxyl number: 35
Molecular weight: 3000
Viscosity: 1300 cps/25° C.

PREPARATION EXAMPLE 4

(The product here is hereinafter referred to as "IMR-D")

Ricinoleic acid 7 moles and titanium tetrabutyrate 50 ppm were placed in a 3 l. flask and the reaction was carried out following the procedure of Preparation Example 1.

The resulting release agent had the following characteristics.
Acid value: 9.5
Hydroxyl number: 34
Molecular weight: 3000
Viscosity: 1000 cps/25° C.

The other materials used in working examples of the present invention and comparative examples were as shown below.

Aromatic polyisocyanate:
  Manufactured by Mitsui Toatsu Chemicals, Inc.
  Tolylene-2,4-diisocyanate
  Trade name T-100
Alicyclic polyisocyanate:
  Isocyanate -3,3,5-trimethyl-5-isocyanatomethylcyclohexane
  Manufactured by Daicel Hüls
  Trade name IPDI
Aralkyl polyisocyanate:
  $\alpha,\alpha,\alpha',\alpha'$-tetramethylxylylene diisocyanate
  Manufactured by Takeda Yakuhin
  Trade name TMXDI
Aromatic diamine crosslinking agent (DETDA):
  Manufactured by Ethyl Cooperation
  Trade name Ethacure 100
  Active hydrogen value: 630 mg/KOH
Aromatic diamine crosslinking agent:
  1,1-Dimethyl-4,6-dimethyl-5,7-diaminoindane (hereinafter referred to as DMAI)
  Active hydrogen value: 550 mg/KOH
Glycol crosslinking agent (EG):
  Manufactured by Mitsui Toatsu Chemicals, Inc.
  Ethylene glycol
MDI prepolymer (I):
  Reaction product of 16.4 parts by weight of tripropylene glycol and 100 parts by weight of 4,4'-diphenylmethane diisocyanate
  NCO %: 22.5%
  Viscosity: 800 cps/25° C.
MDI prepolymer (II):
  Reaction product of PPG(A), 20 parts by weight of MDI containing 30% 2,4-diphenylmethane diisocyanate and 80 parts by weight of carbodiimide-modified
  MDI containing 29% NCO;
  NCO %: 22.5%
  Viscosity: 500 cps/25° C.
PPG(A):
  Polyether triol having a molecular weight of 5000 produced by using glycerine as an initiator, adding propylene oxide and adding 20% ethylene oxide to the molecular ends
  Hydroxyl number: 34
  Viscosity: 1200 cps/25° C.
PPG(B):
  Polyether diol having a molecular weight of 2000 produced by using tripropylene glycol as an initiator and adding propylene oxide;
  Hydroxyl number: 56
  Viscosity: 700 cps/25° C.
Polyether amine (J):
  Jeffamine LMT-3001
  Manufactured by Texaco Chemical Co.
  Compound having primary amino groups at the molecular ends produced by reacting a mixture of 50 parts by weight of polyether triol having a molecular weight of 3000 and 50 parts by weight of polyether diol having a molecular weight of 2000 with ammonia in the presence of a catalyst
DABCO 33LV:
  33% solution of dipropylene glycol (DPG) in triethylene diamine as a solvent (catalyst)
DBTDL:
  Dibutyl tin laurate (catalyst)
AE-300
  Trade name, manufactured by Mitsui Toatsu Chemicals, Inc.
  Addition product of ethylene diamine and propylene oxide OH #770
JEFFAMINE D-400:
  Manufactured by Texaco Chemical Co.
  Polyether having amino groups at the molecular ends having a molecular weight of 400
Zinc stearate:
  Manufactured by Nippon Yushi K.K.

COMPARATIVE EXAMPLES 1-11

A planar sheet was produced according to reaction injection molding by means of a mini-RIM foaming machine manufactured by Toho Kikai K.K. The mold size was 200×300×3 mm and the mold temperature was set at 70° C. The injection speed was 200 g/sec, the resin temperature 40° C., and the isocyanate temperature 40° C. The amount of air was kept at 30% in the resin and the isocyanate index at about 105.

An external release agent, D-186, manufactured by Chukyo Yushi K.K., was applied to the mold by means of a spray. The number of times of releasing was determined by washing sufficiently the mold with a solvent, dimethylformamide (DMF), drying, spraying D-186, fixing the residence time in the mold to 30 sec., and measuring multiple release time.

The green strength increases with the lapse of time. The green strength is shown in terms of a period of time (sec.) between the start of injection and a time at which the strength of the molded planar sheet becomes strong enough to withstand a 180°-bending test without forming cracks.

The stiffness upon releasing (shape keeping property) was determined by curing the sheet sample in a mold for 30 sec., taking out the sheet sample, positioning the sample over an overhang (250 mm long) and measuring the sag (cm). The larger the sag, the poorer the development of the stiffness.

The coating test was effected by conducting postcuring of the sheet sample released from a mold at 120° C. for 30 min., placing the sample horizontally in a vapor vessel of 1,1,1-trichloroethane, washing the sample for 30 sec., applying Flexen #600 primer manufactured by Japan Bee-Chemical Co. and Soflex U-100 primer manufactured by Kansai Paint Co. to the sample thus washed, stoving, and observing the surface state and conducting a crosshatch adhesive test using a tape.

The test results are shown in Table 1.

When a hydroxy fatty acid ester alone was used as an internal release agent, the number of times of releasing was better than that when no internal release agent Was used, but the green strength was poorer. Further, the shape keeping property upon releasing was also poorer than that when no internal release agent was used.

COMPARATIVE EXAMPLE 12

Zinc stearate was used as an internal release agent. Zinc stearate (1.5 parts by weight) was added to a mixture of 2.7 parts by weight of Jeffamine D-400 and 2.7 parts by weight of AE-300, and heated at 110° C. for 30 min. to dissolve zinc stearate in the mixture.

The resulting solution was cooled and added to a prescribed amount of a resin, and the result of molding was evaluated.

The result is described in Table 1.

The multiple release times, green strength and stiffness upon releasing were not problematic, but the occurrence of fish eyes and crosshatch adhesive test were poorer than those resulting from the hydroxy fatty acid ester type release agent.

EXAMPLES 1-3

Six equivalents (522 g) of TDI-100 was reacted with 4 equivalents (6400 g) of IMR-A at 100° C. for 2 hours to prepare a prepolymer containing 1.34% NCO (hereinafter referred to as "TDI prepolymer (A)")(Viscosity: 8000 cps/25° C.).

To each of 22 parts by weight (0.247 equivalents) of DETDA was added dropwise each of the above mentioned TDI prepolymers, 5 parts by weight (0.00160 equivalents), 10 parts by weight (0.00319 equivalents), and 15 parts by weight (0.00480 equivalents) at room temperature and mixed with stirring for one hour.

After one day, absorption of NCO in infrared absorption spectrum was measured, but no absorption of NCO was observed in any of them.

The above-mentioned products are called hereinafter DEIMR-A (5), DEIMR-A (10), DEIMR-A (15), respectively.

The active hydrogen values and viscosities were as shown below.

|  | Active hydrogen value (mg/KOH) | Viscosity (cps/25° C.) |
|---|---|---|
| DEIMR - A (5) | 484 | 1200 |
| DEIMR - A (10) | 410 | 3000 |
| DEIMR - A (15) | 354 | 16400 |

The above-mentioned products were used as internal release agents. The result is shown in Table 2.

EXAMPLE 4

Six equivalents (522 g) of TDI-100 was reacted with 4 equivalents (5620 g) of IMR-B at 100° C. for 2 hours to prepare a terminal TDI prepolymer containing 1.55% NCO (Viscosity: 12000 cps/25° C.).

To 22 parts by weight of DETDA was added dropwise 10 parts by weight of the above-mentioned TDI prepolymer at room temperature and mixed with stirring for one hour.

After one day, absorption of NCO in infrared absorption spectrum was measured, but no absorption of NCO was observed. The above-mentioned product is called hereinafter "DEIMR-B (10)". The active hydrogen value and viscosity were as shown below.

|  | Active hydrogen value (mg/KOH) | Viscosity (cps/25° C.) |
|---|---|---|
| DEIMR - B (10) | 430 | 6000 |

The above-mentioned product was used as an internal release agent. The result is shown in Table 2.

EXAMPLE 5

Six equivalents of TDI-100 was reacted with 2 equivalents of IMR-C at 100° C. for 2 hours to prepare a terminal TDI prepolymer containing 1.31% NCO.

To 22 parts by weight of DETDA was added dropwise 10 parts by weight of the above-mentioned TDI prepolymer at room temperature and mixed with stirring for one hour. After one day, absorption of NCO in infrared absorption spectrum was measured, but no absorption of NCO was observed. The above-mentioned product is called hereinafter "DEIMR-C (10)".

The active hydrogen value and viscosity were as shown below.

|  | Active hydrogen value (mg/KOH) | Viscosity (cps/25° C.) |
|---|---|---|
| DEIMR - C (10) | 408 | 2800 |

The above-mentioned product was used as an internal release agent. The result is shown in Table 2.

EXAMPLE 6

Six equivalents of TDI-100 was reacted with 4 equivalents of IMR-A at 100° C. for 2 hours to prepare a terminal TDI prepolymer containing 1.31% NCO.

To 40 parts by weight of PPG (A) and 2 parts by weight of DETDA was added dropwise 10 parts by weight of the abovementioned TDI prepolymer at room temperature and mixed with stirring for one hour.

The reaction product was white and turbid, but no gelation occurred. After one day, absorption of NCO in infrared absorption spectrum was measured, but no absorption of NCO was observed.

The product is called hereinafter "DEIMR-A (2)". The active hydrogen value and viscosity were as shown below.

|  | Active hydrogen value (mg/KOH) | Viscosity (cps/25° C.) |
|---|---|---|
| DEIMR - A (2) | 50.0 | 1500 |

The above-mentioned product was used as an internal release agent. The result is shown in Table 2.

EXAMPLE 7

Six equivalents of TDI-100 was reacted with 4 equivalents of IMR-A at 100° C. for 2 hours to prepare a prepolymer containing 1.31% NCO.

PPG (A), 40 parts by weight (0.030 equivalents), was mixed with Jeffamine D-400, 3 parts by weight (0.015 equivalents) with stirring and the above-mentioned TDI prepolymer, 10 parts by weight (0.031 equivalents), was added dropwise thereto at room temperature followed by mixing with stirring for one hour.

The reaction product was white and turbid, but no gelation occurred. After one day, absorption of NCO in infrared absorption spectrum was measured, but no absorption of NCO was observed.

The active hydrogen value and viscosity were as shown below.

|  | Active hydrogen value (mg/KOH) | Viscosity (cps/25° C.) |
|---|---|---|
| DJIMR - A (3) | 48 | 2200 |

The above-mentioned product was used as an internal release agent. The result is shown in Table 2.

EXAMPLE 8

Six equivalents of TDI-100 was reacted with 4 equivalents of IMR-A at 100° C. for 2 hours to prepare a prepolymer containing 1.31% NCO.

To 90 parts by weight (0.055 equivalents) of PPG (A) was added 24 parts by weight (0.35 equivalents) of 1,1-dimethyl-4, 6-dimethyl-5, 7-diaminoindane (DMAI) in the liquid form prepared by heating and thereby an amine-containing solution was obtained.

Then 10 parts by weight (0.0061 equivalents) of the above-mentioned prepolymer was added dropwise at room temperature to the amine-containing solution (0.29 equivalents) followed by mixing with stirring for one hour. After one day, absorption of NCO in infrared adsorption spectrum was measured, but no absorption of NCO was observed.

The resulting product is called hereinafter "DMIMR-A (10)".

The active hydrogen value and viscosity were as shown below.

|  | Active hydrogen value (mg/KOH) | Viscosity (cps/25° C.) |
|---|---|---|
| DEIMR - A (10) | 131 | 2000 |

The above-mentioned product was used as an internal release agent. The result is as shown in Table 2.

EXAMPLE 9

Six equivalents of TDI-100 was reacted with 2 equivalents of IMR-A at 100° C. for 2 hours, and then 2 equivalents of PPG (B) was added thereto and the reaction was carried out for a further one hour to prepare a prepolymer containing 1.56% NCO (viscosity: 13000 cps/25° C.).

In a manner similar to Example 8, heat-melted 1,1-dimethyl-5,7-diaminoindane (DMI), 24 parts by weight (0.0235 equivalents), was added to PPG (A), 90 parts by weight (0.061 equivalents), to prepare an amine-containing solution.

Then, the above-mentioned prepolymer, 10 parts by weight (0.0371 equivalents), was added dropwise to the amine-containing solution (0.296 equivalents) at room temperature followed by mixing with stirring for one hour. After one day, absorption of NCO in infrared absorption spectrum was measured, but no absorption of NCO was observed. The product is hereinafter called "DMIMR-AP (10)".

The active hydrogen value and viscosity were as shown below.

|  | Active hydrogen value (mg/KOH) | Viscosity (cps/25° C.) |
|---|---|---|
| DEIMR - AP (2) | 128 | 2500 |

The above-mentioned product was used as an internal release agent. The result is shown in Table 2.

EXAMPLE 10

Six equivalents of TDI-100 and 4 equivalents of IMR-D were reacted at 100° C. for two hours to prepare a prepolymer containing 1.30% NCO (Viscosity: 7500 cps/25° C.).

In a manner similar to Example 8, heat-melted 1,1-dimethyl-5,7-diaminoindane (DMI), 24 parts by weight (0.235 equivalents) was added to PPG (A), 90 parts by weight, to prepare an amine-containing solution.

Then the prepolymer, 10 parts by weight (0.037 equivalents), was added dropwise to the amine-containing solution (0.296 equivalents) at room temperature followed by mixing with stirring for one hour. After one day, absorption of NCO in infrared absorption spectrum was measured, but no absorption of NCO was observed.

The product is hereinafter called "DMIMR-D (10)".

The active hydrogen value and viscosity were as shown below.

|  | Active hydrogen value (mg/KOH) | Viscosity (cps/25° C.) |
|---|---|---|
| DEIMR - D (10) | 130 | 2600 |

The above-mentioned product was used as an internal release agent. The result is shown in Table 2.

EXAMPLE 11

The reaction of 6 equivalents of IPDI with 2 equivalents of IMR-A was carried out at 100° C. for 2 hours, and then 2 equivalents of PPG (B) was added followed by effecting the reaction for further two hours to prepare a prepolymer containing 1.56% NCO (Viscosity: 8000 cps/25° C.).

To PPG (A), 90 parts by weight (0.054 equivalents), was added DETDA, 22 parts by weight (0.247 equivalents), to prepare an amine-containing solution.

The prepolymer, 10 parts by weight (0.00371 equivalents) was added dropwise to the amine-containing solution (0.302 equivalents) at room temperature and mixed with stirring. After one day, absorption of NCO in infrared absorption spectrum was measured, but no absorption of NCO was observed.

The resulting product is hereinafter called "DEIPIMR-AP (10)".

The active hydrogen value and viscosity were as shown below.

| Active hydrogen value | 137 |
|---|---|
| Viscosity | 1800 cps/25° C. |

The above-mentioned product was used as an internal release agent. The result is shown in Table 2.

EXAMPLE 12

The reaction of 6 equivalents of TMXDI with 2 equivalents of IMR-A was effected at 120° C. for 2 hours, and then, 2 equivalents of PPG (B) was added to the reaction product and the reaction was carried out for further two hours to prepare a prepolymer containing 1.54% NCO (Viscosity: 7500 cps/25° C.).

PPG (A), 90 parts by weight (0.054 equivalents) and DETDA, 22 parts by weight (0.247 equivalents) were mixed to prepare an amine-containing solution. The prepolymer, 10 parts by weight (0.00367 equivalents), was added dropwise to the amine-containing solution (0.302 equivalents) at room temperature and mixed with stirring.

After one day, absorption of NCO in infrared absorption spectrum was measured, but no absorption of NCO was observed.

The resulting product is hereinafter called "DETMIMR-AP (10)". The active hydrogen value and viscosity were as shown below.

| Active hydrogen value | 136 |
|---|---|
| Viscosity | 1700 cps/25° C. |

The above-mentioned product was used as an internal release agent. The result is described in Table 2.

EXAMPLE 13

DEIMR-A (5) of the present invention was used as an internal release agent for a urea elastomer. The result is shown in Table 4.

It is clear from Table 4 that the releasing property, green strength and shape keeping property are excellent.

EXAMPLE 14

Two equivalents of TMXDI and one equivalent of IMR-A were reacted at 120° C. for two hours to prepare a prepolymer containing 2.60% NCO (Viscosity: 4000 cps/25° C.).

The prepolymer, 5 parts by weight (0.003 equivalents), was added dropwise to 22 parts by weight (0.247 equivalents) of DETDA at room temperature and mixed with stirring.

After one day, absorption of NCO in infrared absorption spectrum was measured, but no absorption of NCO was observed.

The product is hereinafter called "DETMIMR-A (5)".

The active hydrogen value and viscosity were as shown below.

| Active hydrogen value | 505 |
|---|---|
| Viscosity | 600 cps/25° C. |

The above-mentioned product was used as an internal release agent. The result is shown in Table 4.

COMPARATIVE EXAMPLE 13

Following the procedure of Japanese Patent Publication No. 29453/1989, a small amount of IMR-A was reacted with a large amount of an isocyanate to prepare a prepolymer.

That is, to 580 parts by weight of MDI prepolymer (I) was added 100 parts by weight of IMR-A and the reaction was effected at 80° C. for two hours to prepare MDI prepolymer containing 19.0% NCO [hereinafter referred to as "MDI prepolymer (IMR-A)"].

When the above-mentioned prepolymer was allowed to stand at room temperature, separation occurred and after one day, it was observed that MDI crystals separated.

Machine molding was effected by heating the prepolymer at 80° C. for 4 hours to dissolve MDI crystals and immediately after the crystals were dissolved, the liquid temperature was adjusted to 30° C. and molding was effected.

The test result is shown in Table 3.

There was a releasing function, but it was poorer than that when IMR-A was added to PPG (A) (Comparison Example 2).

The green strength was somewhat better than that when IMR-A was added to PPG (A) (Comparative Example 2), but poorer than that in Example 1.

The stiffness upon releasing (shape keeping property) was not sufficient.

COMPARATIVE EXAMPLE 14

TDI prepolymer (IMR-A) (as used in Example 1), 8.9 parts by weight, and MDI prepolymer (I), 52.2 parts by weight, were mixed with stirring. The NCO content in the resulting mixture was 20.9%.

The result of molding is shown in Table 3. At a cure time of 30 sec., cracking occurred upon demolding and therefore, releasing of the sheet sample was not possible. At a cure time of 3 min., releasing was effected, and the multiple release times was 3-4 times. This number was almost the same as that without IMR-A.

In view of Comparative Examples 13 and 14 and Examples 8 and 9, the internal release agents having terminal amino groups of the present invention have an effective releasing property, good green strength and stiffness in RIM process.

COMPARATIVE EXAMPLES 15-16

In Comparative Example 15, IMR-A was not used as an internal release agent while IMR-A was used in Comparative Example 16. The result is shown in Table 4. When IMR-A was used (in Comparative Example 16), the releasing property was improved. However the number of times of continuous releasing, green strength, and shape keeping property were poorer than those of Examples 13 and 14.

In the present invention, the hydroxyl number is measured according to JIS K 1557-1970 (Testing Method of Polyether for Polyurethane) where a sample is esterified with a solution of phthalic anhydride in pyridine and the excess reagent is titrated with a solution of sodium hydroxide.

TABLE 1

| Comparative Example | | 1 | 2 | 3 | 4 | 5 | 6 |
|---|---|---|---|---|---|---|---|
| PPG-A | | 100 | 95 | 90 | 85 | 90 | 90 |
| IMR-A | | | 5 | 10 | 15 | | |
| IMR-B | | | | | | 10 | |
| IMR-C | | | | | | | 10 |
| IMR-D | | | | | | | |
| Zinc stearate | | | | | | | |
| DETDA | | 22 | 22 | 22 | 22 | 22 | 22 |
| EG | | | | | | | |
| DAI | | | | | | | |
| D-400 | | 2.7 | 2.7 | 2.7 | 2.7 | 2.7 | 2.7 |
| AE-300 | | 2.7 | 2.7 | 2.7 | 2.7 | 2.7 | 2.7 |
| DABCO 33LV | | 0.15 | 0.15 | 0.15 | 0.15 | 0.15 | 0.15 |
| DBTDL | | 0.10 | 0.10 | 0.10 | 0.10 | 0.10 | 0.10 |
| MDI Prepolymer (I) | | 70.2 | 70.2 | 70.2 | 70.2 | 70.2 | 70.2 |
| Multiple release times | | 5-6 | 12 | 16 | 14 | 1 | 1 |
| Green strength (sec) | | 30 | 40 | 50 | 70 | Surface Cracking upon Releasing | Surface Cracking upon Releasing |
| Sag upon releasing (cm) | | 12 | 14 | 16 | 18 | 16 | 16 |
| Coating test | Flexon #600 Fish eyes | None | None | None | None | None | None |
| | Crosshatch adhesive test | Pass | Pass | Pass | Pass | Pass | Pass |
| | Soflex U-100 Fish eyes | None | None | None | None | None | None |
| | Crosshatch adhesive test | Pass | Pass | Pass | Pass | Pass | Pass |

| Comparative Example | | 7 | 8 | 9 | 10 | 11 | 12 |
|---|---|---|---|---|---|---|---|
| PPG-A | | 100 | 95 | 100 | 90 | 90 | 100 |
| IMR-A | | | 5 | | 10 | | |
| IMR-B | | | | | | | |
| IMR-C | | | | | | | |
| IMR-D | | | | | | 10 | |
| Zinc stearate | | | | | | | 1.5 |
| DETDA | | 2 | 2 | | | | 22 |
| EG | | 15 | 15 | | | | |
| DAI | | | | 24 | 24 | 24 | |
| D-400 | | | | | | | 2.7 |
| AE-300 | | | | | | | 2.7 |
| DABCO 33LV | | 1.5 | 1.5 | 0.15 | 0.15 | 0.15 | 0.15 |
| DBTDL | | 0.02 | 0.02 | 0.10 | 0.10 | 0.10 | 0.10 |
| MDI Prepolymer (I) | | 111.1 | 111.1 | 58.1 | 58.1 | 58.1 | 70.2 |
| Multiple release times | | 4 | 8 | 5 | 13 | 1 | 30 or more |
| Green strength (sec) | | 30 | 60 | 30 | 60 | Surface Cracking upon Releasing | 30 |
| Sag upon releasing (cm) | | 14 | 18 | 13 | 16 | 16 | 12 |
| Coating test | Flexon #600 Fish eyes | None | None | None | None | None | Somewhat present |
| | Crosshatch adhesive test | Pass | Pass | Pass | Pass | Pass | Pass |
| | Soflex U-100 Fish eyes | None | None | None | None | None | Present |
| | Crosshatch adhesive test | Pass | Pass | Pass | Pass | Pass | Not good |

TABLE 2

| Example | 1 | 2 | 3 | 4 | 5 | 6 |
|---|---|---|---|---|---|---|
| PPG-A | 95 | 90 | 85 | 90 | 90 | 50 |
| DEIMR-A (5) | 27 | | | | | |
| DEIMR-A (10) | | 32 | | | | |
| DEIMR-A (15) | | | 37 | | | |
| DEIMR-B (10) | | | | 32 | | |
| DEIMR-C (10) | | | | | 32 | |
| DEIMR-A (2) | | | | | | 52 |
| DEIMR-A (3) | | | | | | |
| DAIIMR-A (10) | | | | | | |
| DAIIMR-AP (10) | | | | | | |
| DAIIMR-D (10) | | | | | | |
| DEIPIMR-AP (10) | | | | | | |

TABLE 2-continued

| | | | | | | |
|---|---|---|---|---|---|---|
| DETMIMR-AP (10) | | | | | | 15 |
| DETDA | | | | | | |
| EG | | | | | | |
| D-400 | 2.7 | 2.7 | 2.7 | 2.7 | 2.7 | 2.7 |
| AE-300 | 2.7 | 2.7 | 2.7 | 2.7 | 2.7 | 2.7 |
| DABCO 33LV | 0.15 | 0.15 | 0.15 | 0.15 | 0.15 | 0.5 |
| DBTDL | 0.10 | 0.10 | 0.10 | 0.10 | 0.10 | 0.02 |
| MDI Prepolymer (I) | 66.9 | 66.4 | 65.8 | 68.7 | 66.2 | 109.9 |
| Multiple release times | 15 | 21 | 25 | 19 | 20 | 10 |
| Green strength (sec) | 30 | 30 | 30 | 30 | 30 | 30 |
| Sag upon releasing (cm) | 12 | 12 | 11 | 11 | 12 | 14 |
| Coating test Flexon #600 Fish eyes | None | None | None | None | None | None |
| Crosshatch adhesive test | Pass | Pass | Pass | Pass | Pass | Pass |
| Soflex U-100 Fish eyes | None | None | None | None | None | None |
| Crosshatch adhesive test | Pass | Pass | Pass | Pass | Pass | Pass |

| Example | 7 | 8 | 9 | 10 | 11 | 12 |
|---|---|---|---|---|---|---|
| PPG-A | | | | | | |
| DEIMR-A (5) | | | | | | |
| DEIMR-A (10) | | | | | | |
| DEIMR-A (15) | | | | | | |
| DEIMR-B (10) | | | | | | |
| DEIMR-C (10) | | | | | | |
| DEIMR-A (2) | | | | | | |
| DEIMR-A (3) | 53 | | | | | |
| DAIIMR-A (10) | | 124 | | | | |
| DAIIMR-AP (10) | | | 124 | | | |
| DAIIMR-D (10) | | | | 124 | | |
| DEIPIMR-AP (10) | | | | | 122 | |
| DETMIMR-AP (10) | | | | | | 122 |
| DETDA | 22 | | | | 2.7 | 2.7 |
| EG | | | | | 2.7 | 2.7 |
| D-400 | 2.7 | | | | | |
| AE-300 | | | | | | |
| DABCO 33LV | 0.15 | 0.15 | 0.15 | 0.15 | 0.15 | 0.15 |
| DBTDL | 0.10 | 0.10 | 0.10 | 0.10 | 0.10 | 0.10 |
| MDI Prepolymer (I) | 69.4 | 56.7 | 55.5 | 55.5 | 68.3 | 68.2 |
| Multiple release times | 16 | 24 | 30 or more | 11 | 30 or more | 30 or more |
| Green strength (sec) | 30 | 30 | 30 | 45 | 30 | 30 |
| Sag upon releasing (cm) | 11 | 12 | 11 | 12 | 12 | 12 |
| Coating test Flexon #600 Fish eyes | None | None | None | None | None | None |
| Crosshatch adhesive test | Pass | Pass | Pass | Pass | Pass | Pass |
| Soflex U-100 Fish eyes | None | None | None | None | None | None |
| Crosshatch adhesive test | Pass | Pass | Pass | Pass | Pass | Pass |

TABLE 3

| Comparative Example | 13 | 14 |
|---|---|---|
| PPG-A | 90 | 90 |
| DAI | 24 | 24 |
| BABCO 33LV | 0.15 | 0.15 |
| DBTDL | 0.10 | 0.10 |
| MDI prepolymer (I) | | 52.2 |
| MDI prepolymer (IMR-A) | 67.3 | |
| TDI prepolymer (IMR-A) | | 8.9 |
| Multiple release times | 12 | 1 |
| Green strength (sec.) | 45 | Surface cracking upon releasing |
| Sag upon releasing (cm.) | 16 | 16 |

TABLE 4

| | Comparative Example 15 | Comparative Example 16 | Example 13 | Example 14 |
|---|---|---|---|---|
| LMT-3001 | 100 | 95 | 95 | 95 |
| IMR-A | | 5 | | |
| DETDA | 44 | 44 | 22 | 22 |
| DEIMR-A (5) | | | 27 | |
| DETMIMR-A (5) | | | | 27 |
| MDI prepolymer (11) | 116.4 | 116.4 | 112.9 | 114.6 |
| Multiple release times | 10 | 25 | 30 or more | 30 or more |
| Green strength (sec.) | 30 | 70 | 30 | 30 |
| Sag upon releasing (cm) | 4 | 7 | 3 | 3 |

What is claimed is:

1. A resin composition which comprises a product prepared by the reaction of
   (a) a prepolymer prepared by reacting at least one member selected from the group consisting of a hydroxy fatty acid ester and a mixture of a hydroxy fatty acid ester and a polyether polyol with a diisocyanate,
   with
   (b) a member selected from the group consisting of a polyamine-polyimine component selected from the group consisting of aromatic polyamines, polyether polyamines and polyether polyimines and a mixture of the polyamine-polyimine component and a polyether polyol, at least two equivalents of component (b) being reacted with one equivalent of component (a).

2. A resin composition according to claim 1 in which the hydroxy fatty acid ester in component (a) is at least one member selected from the group consisting of self-condensation products of ricinoleic acid, self-condensation products of 12-hydroxystearic acid, condensation products of ricinoleic acid and 12 hydroxystearic acid, and condensation products of dihydric alcohol having a molecular weight of 62–400 and a member selected from the group consisting of ricinoleic acid and 12-hydroxystearic acid.

3. A resin composition according to claim 1 in which the hydroxyl value of the hydroxy fatty acid ester in component (a) ranges from 12 to 125.

4. A resin composition according to claim 1 in which the average molecular weight of the hydroxy fatty acid ester of component (a) ranges from 900–4500.

5. A resin composition according to claim 1 in which the molecular weight of the polyether polyol in component (a) ranges from 800 to 12000.

6. A resin composition according to claim 1 in which the diisocyanate in component (a) is at least one member selected from the group consisting of aliphatic polyisocyanates, alicyclic polyisocyanates, aromatic polyisocyanates, and aralkyl polyisocyanates.

7. A resin composition according to claim 1 which the diisocyanate has a molecular weight ranging from 100 to 1000.

8. A resin composition according to claim 1 in which the prepolymer of component (a) is reacted with the polyamine-polyimine component of component (b) to form a reaction product having at least one of amino and imino groups at the ends of the molecule.

9. A resin composition according to claim 1 in which the prepolymer of component (a) is prepared by reacting one equivalent of the hydroxy fatty acid ester or the mixture of the hydroxy fatty acid ester and the polyether polyol with 1–2 equivalents of the diisocyanate.

10. A resin composition according to claim 1 in which the prepolymer of component (a) contains 0.5–5% by weight of NCO group.

11. A resin composition according to claim 1 in which the aromatic polyamine of component (b) is a member selected from the group consisting of compounds of the formulas,

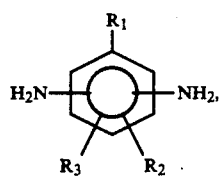

(I)

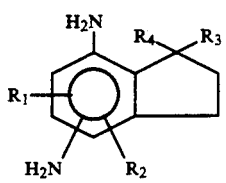

(II)

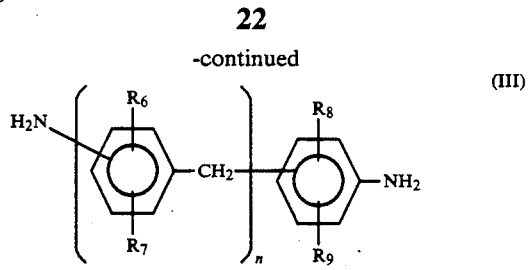

(III)

where $R_1$, $R_2$, $R_3$, $R_4$ and $R_5$ are independently selected from the group consisting of hydrogen and alkyl having 1–10 carbon atoms; when at least one of $R_1$, $R_2$ and $R_3$ is alkyl in formula (I), the alkyl is at the ortho position with respect to at least one amino group; when at least one of $R_1$ and $R_2$ is alkyl in formula (II), the alkyl is at the ortho position with respect to at least one amino group; and $R_6$, $R_7$, $R_8$ and $R_9$ are independently selected from the group consisting of hydrogen and alkyl having 1–10 carbon atoms and n is an integer of 1–10.

12. A resin composition according to claim 1 in which the polyether polyamine of component (b) is a polyether polyol of which the ends of the molecule are substituted with at least one member selected from the group consisting of primary amino and secondary amino groups and the polyether polyimine of component (b) is a polyether polyol of which the ends of the molecule are substituted with an imino group.

13. A resin composition according to claim 1 in which the amount of the polyether polyol is one equivalent or less per one equivalent of the polyamine-polyimine component in the mixture of polyamine-polyimine component and polyether polyol.

14. A resin composition according to claim 13 in which the molecular weight of the polyether polyol ranges from 800 to 12000.

15. A method of reaction injection molding comprising reaction injection molding the resin composition of claim 1 and an additional resin.

16. A method according to claim 15 in which the additional resin is a polyurethane resin or a polyurea resin.

17. A molded product which is obtained by reaction injection molding the resin composition of claim 1 and an additional resin.

18. A molded product according to claim 17 in which the additional resin is a polyurethane resin or a polyurea resin.

19. A molded product according to claim 18 in which the polyurethane resin or polyurea resin has an isocyanate index of 70–130 and contains 4,4'-diisocyanato-diphenylmethane or 2,4'-diisocyanato-diphenylmethane.

20. A molded product according to claim 19 in which there is additionally contained at least one member selected from the group consisting of a polymer reactive with an isocyanato group and having a molecular weight of 800–12000, a compound of the formula (I), a compound of the formula (II) and a compound of the formula (III),

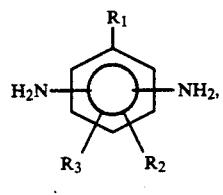

(I)

-continued

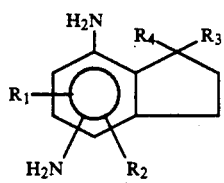
(II)

-continued

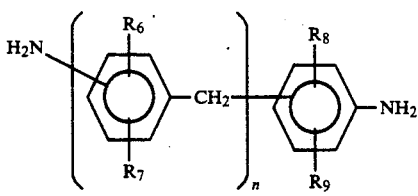
(III)

where $R_1$, $R_2$, $R_3$, $R_4$ and $R_5$ are independently selected from the group consisting of hydrogen and alkyl having 1-10 carbon atoms; when at least one of $R_1$, $R_2$ and $R_3$ is alkyl in formula (I), the alkyl is at the ortho position with respect to at least one amino group; when at least one of $R_1$ and $R_2$ is alkyl in formula (II), the alkyl is at the ortho position with respect to at least one amino group; and $R_6$, $R_7$, $R_8$ and $R_9$ are independently selected from the group consisting of hydrogen and alkyl having 1-10 carbon atoms and n is an integer of 1-10.

* * * * *

UNITED STATES PATENT AND TRADEMARK OFFICE
CERTIFICATE OF CORRECTION

PATENT NO. : 5,198,508
DATED : March 30, 1993
INVENTOR(S) : Ueda et al.

It is certified that error appears in the above-identified patent and that said Letters Patent is hereby corrected as shown below:

Column 21, formula (II), please amend "$R_3$" to --$R_5$--.

Column 23, formula (II), please amend "$R_3$" to --$R_5$--.

Column 5, formula (II), please amend "$R_3$" to --$R_5$--.

Signed and Sealed this

Third Day of May, 1994

*Attest:*

BRUCE LEHMAN

*Attesting Officer*     *Commissioner of Patents and Trademarks*